United States Patent
Ferencz et al.

(10) Patent No.: US 10,829,582 B2
(45) Date of Patent: Nov. 10, 2020

(54) MULTIPHASE POLYURETHANE COMPOSITION HAVING REDUCED FOAM DEVELOPMENT

(71) Applicant: Henkel AG & Co. KGaA, Duesseldorf (DE)

(72) Inventors: Andreas Ferencz, Duesseldorf (DE); Olaf Lammerschop, Krefeld (DE); Andreas Niegemeier, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/342,449

(22) Filed: Nov. 3, 2016

(65) Prior Publication Data

US 2017/0073454 A1    Mar. 16, 2017

Related U.S. Application Data

(63) Continuation of application No. PCT/EP2015/059645, filed on May 4, 2015.

(30) Foreign Application Priority Data

May 5, 2014 (DE) .................. 10 2014 208 353

(51) Int. Cl.

| | |
|---|---|
| *C08G 18/08* | (2006.01) |
| *C08G 18/48* | (2006.01) |
| *C08J 5/04* | (2006.01) |
| *C08G 18/20* | (2006.01) |
| *C08G 18/42* | (2006.01) |
| *C08G 18/76* | (2006.01) |
| *B29C 70/48* | (2006.01) |
| *C08K 5/103* | (2006.01) |
| *C08K 5/10* | (2006.01) |
| *C08K 5/49* | (2006.01) |
| *B29L 31/30* | (2006.01) |

(52) U.S. Cl.

CPC .......... *C08G 18/0871* (2013.01); *B29C 70/48* (2013.01); *C08G 18/2081* (2013.01); *C08G 18/4233* (2013.01); *C08G 18/4288* (2013.01); *C08G 18/4829* (2013.01); *C08G 18/7664* (2013.01); *C08G 18/7671* (2013.01); *C08J 5/04* (2013.01); *C08K 5/10* (2013.01); *C08K 5/103* (2013.01); *C08K 5/49* (2013.01); *B29K 2875/00* (2013.01); *B29L 2031/3055* (2013.01); *C08J 2375/08* (2013.01)

(58) Field of Classification Search

CPC .......... C08G 18/0871; C08G 18/2081; C08G 18/4233; C08G 18/4288; C08G 18/4829; C08G 18/7664; C08G 18/7671; C08K 5/10; C08K 5/103; C08K 5/49; B29C 70/48

See application file for complete search history.

(56) References Cited

U.S. PATENT DOCUMENTS

| | | | | |
|---|---|---|---|---|
| 4,757,123 A | * | 7/1988 | Younes | C08G 18/022 264/331.12 |
| 5,277,862 A | * | 1/1994 | Steppan | B29C 45/0001 264/257 |
| 5,389,696 A | * | 2/1995 | Dempsey | C08G 18/3262 521/128 |
| 5,576,409 A | * | 11/1996 | Mackey | C08G 18/34 528/49 |
| 5,973,099 A | * | 10/1999 | Nodelman | C08G 18/088 264/328.4 |
| 6,793,855 B2 | | 9/2004 | Cheolas et al. | |
| 8,663,414 B2 | | 3/2014 | Nienkemper et al. | |
| 2004/0034113 A1 | * | 2/2004 | Shidaker | B29C 67/246 521/134 |
| 2004/0094859 A1 | * | 5/2004 | Cheolas | B29C 33/60 264/136 |
| 2012/0252973 A1 | * | 10/2012 | Nienkemper et al. | C08G 18/79 524/590 |
| 2013/0316161 A1 | * | 11/2013 | Diena | C08J 5/043 428/220 |
| 2014/0371391 A1 | | 12/2014 | Ferencz et al. | |
| 2015/0125703 A1 | * | 5/2015 | Lindner | C08G 18/4829 428/422.8 |

FOREIGN PATENT DOCUMENTS

| | | | |
|---|---|---|---|
| CN | 1326476 A | 12/2001 | |
| JP | 2001115010 | * 4/2001 | ............. C08L 75/04 |
| WO | 2011067246 A1 | 6/2011 | |
| WO | 2013127732 A1 | 9/2013 | |
| WO | 2013127734 A1 | 9/2013 | |
| WO | WO-2013127734 | * 9/2013 | ............. C08G 18/48 |

OTHER PUBLICATIONS

JP-2001115010_04-2001_English.*
International Search Report for International PCT Patent Application No. PCT/EP2015/059645 dated Jul. 20, 2015.

* cited by examiner

*Primary Examiner* — Michael L Leonard
(74) *Attorney, Agent, or Firm* — James E. Piotrowski

(57) ABSTRACT

The present invention relates to a two-component polyurethane composition composed of at least one polyol, at least one polyisocyanate, and at least one emulsifier which is not homogeneously miscible with the at least one polyol. The present invention further relates to the use of this polyurethane composition as a binder for producing fiber composites, a method for producing these fiber composites, the fiber composites themselves, and use thereof.

19 Claims, No Drawings

MULTIPHASE POLYURETHANE COMPOSITION HAVING REDUCED FOAM DEVELOPMENT

This application is a continuation of International Application No. PCT/EP2015/059645, filed 2015 May 4, which claims the benefit of German Patent Application No. DE 10 2014 208 353.2 filed 2014 May 5, the contents of each of which are incorporated herein by reference in their entirety.

The present invention relates to a two-component polyurethane composition composed of at least one polyol, at least one polyisocyanate, and at least one emulsifier, wherein the composition shows a phase separation after curing. The invention further relates to the use of this polyurethane composition as a binder for producing fiber composites, a method for producing these fiber composites, the fiber composites themselves, and use thereof.

Fiber-reinforced composites are intended to withstand high mechanical stresses. For this purpose, the matrix resins must be stably joined to the fiber materials after curing. Defects have an adverse effect on the mechanical properties of the molded parts. For this reason, blowholes, cavities, or bubbles in the molded part should be avoided. In addition, the cured matrix resins should be characterized by high fracture toughness. Suitable matrix materials based on epoxy binders are known. However, these systems have several disadvantages. For example, they often have very high reactivity, which may result in increased heat generation and impair the properties of the material. Therefore, alternative binders based on reactive two-component polyurethane compositions, so-called 2K PU compositions, have also been developed which generally do not have such pronounced heat generation.

WO 2013/127732 A1 describes a two-component polyurethane composition containing i) 10 to 80% by weight of at least one polyol having a number average molecular weight of 200 g/mol to 3000 g/mol, ii) 5 to 60% by weight of least one aromatic polyisocyanate, iii) 0 to 15% by weight additives, wherein the composition has an NCO:OH ratio of 2:1 to 1:2. A polyurethane composition containing an emulsifier is not disclosed.

WO 2013/127734 A1 discloses a two-component polyurethane composition containing i) 10 to 80% by weight of at least one polyol having a number average molecular weight of 200 g/mol to 3000 g/mol, ii) 5 to 70% by weight of at least one polyisocyanate, iii) 0 to 10% by weight of a catalyst, wherein the composition has an NCO:OH ratio of 2:1 to 1:2. A polyurethane composition containing an emulsifier is not disclosed.

WO 2011/067246 A1 describes pultrusion resin systems containing (a) di- or polyisocyanates, (b) compounds containing at least two groups that are reactive with isocyanates, (c) a catalyst, (d) a higher-functional acid having a functionality greater than or equal to 2, and optionally (e) further auxiliary substances and additives. The examples disclose compositions composed of low-molecular polyether triols and diphenylmethane diisocyanate. A polyurethane composition containing an emulsifier is not disclosed.

Methods for producing fiber composites using 2K PU compositions are known. Typically, fiber materials are placed in closed molds and subsequently encased with the 2K PU composition as a matrix resin. This may be assisted using various methods such as applying pressure, increasing the temperature, or applying a vacuum. It has proven advantageous to use low-viscosity materials in order to reduce defects due to bubble formation. The polyurethane composition thus flows around the fibers more easily, so that air inclusions may be reduced. This is particularly advantageous when the fiber composite is to have a high fiber content.

However, bubble formation is frequently observed in the course of the crosslinking reaction of 2K PU compositions, even when low-viscosity compositions are used, and therefore air inclusions are to be largely avoided. It is assumed that the bubble formation is caused by traces of water which is adsorbed on the surface of the fiber material, and which upon contact with the matrix resin reacts with the isocyanate groups contained therein to form carbon dioxide.

It has also been shown that highly crosslinked 2K PU compositions and corresponding fiber composites frequently have insufficient fracture toughness. In addition, the operational stability is often inadequate, which may result in material failure after an extended period of mechanical stress.

Furthermore, the molded bodies made of fiber composites should be easily removable from the mold after being produced. A release agent is generally applied to the mold to prevent the molded part from sticking to the mold. Additionally or alternatively, internal release agents are used to allow this additional work step to be carried out less often, or even to dispense with it altogether. The internal release agents are admixed with the matrix resin. However, it has been shown that the internal release agents often show an insufficient separation effect.

This has resulted in the object of providing a 2K PU composition which in the crosslinked state shows reduced bubble formation. A further aim is for the crosslinked polyurethane composition to withstand high mechanical stresses on the fiber composite. Lastly, the aim is for a molded body produced from a 2K PU composition to be easily removable from the mold.

It has now surprisingly been found that this object may be achieved by a 2K PU composition composed of a polyol component and a polyisocyanate component, wherein this composition contains an emulsifier which is not homogeneously miscible with the polyol used.

In a first aspect, the invention therefore relates to a two-component polyurethane composition comprising at least one polyol having a number average molecular weight of up to 3000 g/mol, at least one polyisocyanate, and at least one emulsifier, wherein the composition contains the at least one polyol and the at least one polyisocyanate in an NCO:OH ratio of 2:1 to 1:2, and the transmittance of a mixture of the at least one emulsifier and the at least one polyol at 860 nm is less than 90%.

A further subject matter of the invention relates to the use of such a polyurethane composition for producing fiber composites.

In a further aspect, the invention relates to a fiber composite which includes fibers as well as the crosslinked two-component polyurethane composition.

A further subject matter of the invention relates to the use of the fiber composite as an automobile part.

Lastly, the invention is additionally directed to a method for producing fiber composites, in which a mold is initially filled with fiber materials, the two-component polyurethane composition is subsequently introduced into this mold under pressure and/or with application of a vacuum, and the fiber composite is cured at a temperature of up to 140° C., in particular 80 to 120° C.

Further preferred embodiments are described in the dependent claims.

"At least one" as used herein means 1 or more, i.e., 1, 2, 3, 4, 5, 6, 7, 8, 9, or more. With reference to an ingredient, the indication refers to the type of ingredient, and not to the absolute number of molecules. "At least one polyol" thus means, for example, at least one type of polyol; i.e., one type of polyol or a mixture of multiple different polyols may be used. Together with weight indications, the indication refers to all compounds of the stated type which are contained in the composition/mixture; i.e., the composition contains no additional compounds besides the stated quantity of compounds in question.

Unless explicitly stated otherwise, all percentages stated in conjunction with the compositions described herein refer to mass fractions in % by weight, in each case based on the mixture in question.

"Approximately," as used herein in conjunction with a numerical value, refers to the numerical value ±10%, preferably ±5%.

Unless stated otherwise, the molecular weights stated in the present text refer to the number average molecular weight ($M_N$). Unless stated otherwise, all molecular weight indications refer to values which are obtainable by gel permeation chromatography (GPC) against a polystyrene standard in accordance with DIN 55672-1:2007-08.

Unless stated otherwise, the hydroxyl numbers stated in the present text are determined in accordance with DIN 53240-2:2007-11.

In the present text, the OH functionality is understood to mean the average number of hydroxyl groups per molecule. The OH functionality may be calculated from the hydroxyl number and the number average molecular weight.

The NCO content is determined according to Spiegelberger in accordance with DIN EN ISO 11909:2007-05.

The glass transition temperatures stated in the present text are determined by DSC in accordance with DIN EN ISO 11357-1:2010-03.

The modulus of elasticity is determined in accordance with DIN EN ISO 527.

The 2K PU composition according to the invention includes a polyol component and a polyisocyanate component. The polyol component includes at least one polyol and optionally further constituents. The polyisocyanate component includes at least one polyisocyanate and optionally those constituents which do not react with NCO groups. The emulsifier is preferably contained in the polyol component. Alternatively or additionally, the emulsifier may be contained in the polyisocyanate component, provided that the emulsifier does not react with NCO groups.

Polyol compounds known to those skilled in the art may be used as the polyol component. The at least one polyol should preferably contain no further functional groups that are reactive with NCO groups, such as reactive amino groups or carboxyl groups. To achieve a high crosslinking density, and thus improved mechanical properties of the crosslinked 2K PU composition, polyols having a low molecular weight, a high hydroxyl number, and a high OH functionality are preferably used.

According to the invention, the number average molecular weight of the at least one polyol is up to 3000 g/mol, preferably up to 2000 g/mol, more preferably up to 1000 g/mol, even more preferably up to 400 g/mol, particularly preferably 150 to 400 g/mol. The hydroxyl number of the at least one polyol is preferably greater than 100 mg KOH/g, more preferably greater than 250 mg KOH/g, even more preferably greater than 400 mg KOH/g, particularly preferably 500 to 1200 mg KOH/g. Polyols having 2 to 10, preferably 2 to 6, OH groups per molecule are particularly suitable. Mixtures of different polyols may be used, provided that an appropriate average OH functionality is obtained. An average OH functionality of greater than 2.5, preferably 2.5 to 8, more preferably 2.8 to 6, particularly preferably 3 to 5, is particularly preferred. The at least one polyol is preferably an aliphatic polyol. In an aliphatic polyol the hydroxyl groups are bonded to an aliphatic carbon atom.

Polyols may be those which bear terminal hydroxyl groups, i.e., situated at the chain ends. However, this may also involve compounds in which the hydroxyl groups are distributed over the chain at the sides. The hydroxyl groups may be those which are able to react with isocyanates, preferably primary or secondary hydroxyl groups, particularly preferably primary or secondary aliphatic hydroxyl groups, being suitable.

Examples of suitable polyols are those based on polyethers, polyalkylenes, polyesters, or polyurethanes, without being limited thereto.

Suitable as polyols are, for example, liquid polyester polyols which may be prepared by condensation of di- or tricarboxylic acids, such as adipic acid, sebacic acid, and glutaric acid, with low-molecular diols or triols such as ethylene glycol, propylene glycol, diethylene glycol, triethylene glycol, dipropylene glycol, 1,4-butanediol, 1,6-hexanediol, glycerin, or trimethylolpropane. Such OH-functional polyesters are known to those skilled in the art and are commercially available. Polyester polyols containing two or three terminal OH groups are particularly suitable. These polyester polyols preferably have a number average molecular weight of up to 2000 g/mol, in particular 500 to 1000 g/mol.

However, polyester polyols of oleochemical origin may also be used. Such polyester polyols may be prepared, for example, by complete ring opening of epoxidized triglycerides of a mixture of fats which contains at least partially olefinically unsaturated fatty acids, with one or more alcohols having 1 to 12 C atoms, followed by partial transesterification of the triglyceride derivatives to produce alkyl ester polyols having 1 to 12 C atoms in the alkyl moiety. Examples of such polyols are castor oil or dimer fatty diols. These oleochemical polyols preferably have a number average molecular weight of 250 to 2000 g/mol.

Polycarbonate polyols are further suitable polyester polyols. Polycarbonates may be obtained, for example, by reacting diols such as propylene glycol, 1,4-butanediol, or 1,6-hexanediol, diethylene glycol, triethylene glycol, or tetraethylene glycol, or mixtures of two or more of same, with diaryl carbonates, for example diphenyl carbonate, or phosgene.

Polylactones, such as polyesters based on ε-caprolactone, are another group of polyols to be used according to the invention.

Also suitable are polyester polyols which contain one or more urethane groups in the molecular chain.

Low-molecular polyols may also be used. Low-molecular polyols are understood to mean polyols which are not prepared by polymerization or oligomerization, and which comprise 2 to 30 carbon atoms. These low-molecular polyols preferably have an OH functionality of 2 to 10, particularly preferably 2 to 6. These may involve the known polyols such as ethylene glycol, propanediol, 1,4-butanediol, 1,5-pentanediol, 1,6-hexanediol, 1,7-heptanediol, 1,8-octanediol, 1,10-decanediol, 1,12-dodecanediol, dimer fatty alcohol, glycerin, hexanetriol, trimethylolpropane, pentaerythrite, or neopentyl alcohol. So-called sugar alcohols, for example mannitol, sorbitol, or methyl glycosides, may also be used. Particularly preferred low-molecular alcohols are linear alcohols having a number average molecular weight of 60 to 400 g/mol and two to four OH groups.

Polyether polyols and the mixtures thereof are particularly preferred polyols within the scope of the invention. The polyether polyols are reaction products of low-molecular, polyfunctional alcohols with alkylene oxides. The alkylene oxides preferably have 2 to 4 C atoms. These may be difunctional or higher-functional polyols, preferably polyols having 2, 3, or 4 OH groups. Examples are ethylene glycol, propanediol, butanediol, hexanediol, octanediol; polyfunctional alcohols such as glycerin, hexanetriol, trimethylolpropane, pentaerythrite, and neopentyl alcohol; sugar alcohols such as mannitol, sorbitol, and methyl glycosides. Corresponding aromatic polyols such as resorcinol, hydroquinone, 1,2,2- or 1,1,2-tris-(hydroxyphenyl)ethane may also be reacted with the alkylene oxides. Further polyols which are suitable within the scope of the invention result from polymerization of tetrahydrofuran. Statistical and/or block copolymers of ethylene oxide and propylene oxide may be used. Polyether polyols having 2, 3, or 4 OH groups are preferred. The polyether polyols are prepared in a manner known to those skilled in the art and are commercially available. Polyoxyethylene triols or polyoxypropylene triols are particularly preferred. The number average molecular weight of these polyether polyols is preferably 170 to up to 3000 g/mol, particularly preferably 170 to 1000 g/mol, most preferably 170 to 350 g/mol.

In one preferred embodiment, the at least one polyol has a viscosity of less than 5000 mPas, in particular 2700 to 4000 mPas (DIN ISO 2555, Brookfield RVT viscometer, No. 4 spindle, 25° C.; 20 rpm). The polyurethane composition may thus flow around the fibers without air inclusions.

Preferably no polyols which have tertiary amino groups are contained in the composition, since these adversely affect the application properties.

Isocyanates having two or more isocyanate groups are suitable as polyisocyanates in the polyisocyanate component. The polyisocyanates preferably contain 2 to 5, preferably 2 to 4, isocyanate groups.

An aromatic polyisocyanate may be used as the at least one polyisocyanate of the polyisocyanate component. In an aromatic polyisocyanate the NCO groups are bonded to aromatic carbon atoms. Examples of suitable aromatic polyisocyanates are 1,5-naphthylene diisocyanate, 2,4'-, 2,2'-, or 4,4'-diphenylmethane diisocyanate (MDI), xylylene diisocyanate (XDI), m- and p-tetramethylxylylene diisocyanate (TMXDI), 2,4- or 2,6-toluylene diisocyanate (TDI), di- and tetraalkyl diphenylmethane diisocyanate, 3,3'-dimethyldiphenyl-4,4'-diisocyanate (TODI, 1,3-phenylene diisocyanate, 1,4-phenylene diisocyanate, and 4,4'-dibenzyl diisocyanate. Furthermore, the corresponding oligomeric carbodiimide, uretonimine, or isocyanurate derivatives, as well as the higher-functional homologs, for example so-called polymeric MDI (pMDI), may also be used.

The polyisocyanate component may also contain aliphatic polyisocyanates. In an aliphatic polyisocyanate the NCO groups are bonded to aliphatic carbon atoms. Examples of suitable aliphatic polyisocyanates are hydrogenated MDI (H12MDI), 1-methyl-2,4-diisocyanatocyclohexane, 1,12-diisocyanatododecane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), tetramethoxybutane-1,4-diisocyanate, butane-1,4-diisocyanate, hexane-1,6-diisocyanate (HDI), dimer fatty acid diisocyanate, dicyclohexylmethane diisocyanate, cyclohexane-1,4-diisocyanate, ethylene diisocyanate, or phthalic acid-bis-isocyanato ethyl ester. The corresponding carbodiimide, uretonimine, or isocyanurate derivatives may also be used here.

The polyisocyanate component may also contain proportions of low-molecular prepolymers, for example reaction products of MDI or TDI with low-molecular diols or triols such as ethylene glycol, diethylene glycol, propylene glycol, dipropylene glycol, triethylene glycol, glycerin, or trimethylolpropane. These prepolymers may be prepared by reacting an excess of monomeric polyisocyanate in the presence of diols or triols. The number average molecular weight of the diols and triols is generally below 1000 g/mol. The reaction product may optionally be released by distillation of monomeric aromatic isocyanates.

The polyisocyanate component preferably contains the at least one polyisocyanate in a quantity of 5 to 70% by weight, more preferably 20 to 70% by weight, particularly preferably 40 to 70% by weight, based on the total weight of the 2K PU composition.

The at least one polyisocyanate is particularly preferably at least one aromatic polyisocyanate. The polyisocyanate component therefore particularly preferably contains at least one aromatic polyisocyanate in a quantity of 5 to 70% by weight, more preferably 20 to 70% by weight, particularly preferably 40 to 70% by weight, based on the total weight of the 2K PU composition.

The at least one polyisocyanate preferably has an NCO content of greater than 25% by weight, more preferably greater than 28% by weight, particularly preferably greater than 30% by weight, particularly preferably 30 to 50% by weight, based on the at least one polyisocyanate. When only one polyisocyanate is used, the mass fraction refers to the quantity of this polyisocyanate used; in contrast, when a mixture of polyisocyanates is used, the mass fraction refers to the quantity of the mixture of these polyisocyanates used. A high NCO content results in a high crosslinking density, and thus, improved mechanical properties.

The at least one polyisocyanate preferably has a viscosity of less than 80 mPas, in particular 30 to 60 mPas (DIN ISO 2555, Brookfield RVT viscometer, No. 3 spindle, 25° C.; 50 rpm). The 2K PU polyurethane composition may thus flow around the fibers more easily, so that air inclusions are reduced.

It is particularly preferred that the at least one polyisocyanate has a number average molecular weight of less than 1500 g/mol, particularly preferably less than 1000 g/mol.

In one preferred embodiment, less than 25 mol-%, preferably less than 10 mol-%, more preferably less than 3 mol-%, in particular 0.5 mol-% to 2.5 mol-%, of the NCO groups are reacted to form carbodiimide and/or uretonimine groups. These mixtures generally show a particularly suitable viscosity.

In order to obtain stable compositions, the polyisocyanate component preferably contains no constituents which can result in reactions that cause an increase in the viscosity under storage conditions.

A 2K PU composition according to the invention also contains an emulsifier. The emulsifier is preferably used in quantities of 0.2 to 10% by weight, more preferably 0.5 to 6% by weight, particularly preferably 1 to 3% by weight, based on the total weight of the 2K PU composition.

The emulsifier has a suitable surface activity, so that it is present in one of the components, preferably the polyol, in dissolved or dispersed form. A phase separation occurs at the latest upon mixing of the polylol component and the polyisocyanate component and the subsequent crosslinking reaction. This may be achieved, for example, by a suitable selection of the hydrophilic-lipophilic balance (HLB) and/or the critical micelle concentration (CMC). In one preferred embodiment, the emulsifiers have an HLB value of less than 10, in particular less than 5. The HLB value of an emulsifier is determined according to the method of Griffin (W. C. Griffin, "Calculation of HLB Values of Non-Ionic Surfactants," Journal of the Society of Cosmetic Chemists 5 (1954): 249). The HLB value of an emulsifier mixture is the mean of the HLB values of the individual emulsifier components, weighted with the mass fraction.

According to the invention, the at least one emulsifier is not homogeneously miscible with the at least one polyol. This is checked using the following test: 100 g of the at least one polyol and 2 g of the at least one emulsifier are agitated at 25° C. with a SpeedMixer (model DAC 600.1 VAC-P, 250-mL SpeedMixer container) at 2100 rpm for 2 min, and the mixture is subsequently degassed under vacuum with agitation at 800 rpm for 5 min, while reducing the pressure to approximately 50 mbar by means of a diaphragm pump. The mixture is subsequently agitated for 1 min. The transmittance of electromagnetic radiation having a wavelength of 860 nm with a layer thickness of 10 mm is then determined by UV/Vis spectroscopy, based on pure polyol as reference. The determination is carried out in accordance with EN ISO 7027:1999. If the transmittance of the mixture is less than 90%, within the meaning of the invention the at least one emulsifier is "not homogeneously miscible" with the at least one polyol. The transmittance is preferably less than 70%, more preferably less than 50%, in particular less than 30%.

It has surprisingly been shown that the crosslinked 2K PU compositions, which contain emulsifiers that are not homogeneously miscible with the at least one polyol, have greatly reduced bubble formation, show greatly improved mechanical properties, and are more easily removable from the mold, compared to corresponding crosslinked 2K PU compositions which do not contain such emulsifiers.

It is assumed that, due to the reaction of isocyanate groups with moisture, in particular traces of water in the polyol component or on the fibers, carbon dioxide is formed which, together with possibly other dissolved gases, is expelled in the course of curing and the associated reduction in the free volume, and may ultimately result in bubble formation and thus, defects. This is observed with increasing frequency when particularly hydrophilic polyols are used, or the isocyanate functionality is selected to be particularly high. It is now presumed that the use of emulsifiers which are not homogeneously miscible with the polyol results in a phase separation which provides free volume at the phase interface, so that the 2K PU composition has a higher absorption capacity for dissolved gases.

In addition, increased critical stress intensity factors (K1C) appear when suitable emulsifiers are used. The K1C value is a measure of the fracture toughness of the cured matrix resin, and reflects the critical value of the stress for crack growth. The K1C value is determined in accordance with ISO 13586:2000, using a Zwick Z 020 test apparatus and an effective force of 1 kN.

Emulsifiers which contain carboxylic acid ester groups are particularly suitable.

In one preferred embodiment, the emulsifier is a reaction product of at least one aliphatic polyol and at least one aliphatic monocarboxylic acid and/or dicarboxylic acid. The aliphatic polyol preferably has an OH functionality of at least 4. Pentaerythrite is particularly suitable. Oleic acid is preferably used as the aliphatic monocarboxylic acid. Adipic acid and/or a dimer fatty acid are/is particularly suitable as the aliphatic dicarboxylic acid. A reaction product of adipic acid, pentaerythrite, and oleic acid, and optionally a dimer fatty acid, is particularly preferred. In another preferred embodiment, the emulsifier is a dipentaerythrite completely esterified with oleic acid.

It may be advantageous when the emulsifier bears free hydroxyl groups which are able to react with the isocyanate groups in the course of the crosslinking reaction. The emulsifier may thus be integrally incorporated into the matrix.

The 2K PU compositions according to the invention may also contain auxiliary substances or additives, which preferably are completely or partially admixed with the polyol component. Auxiliary substances or additives are understood to mean materials that are generally used in small quantities in order to change the properties of the composition, such as the viscosity, the wetting behavior, the stability, the reaction speed, the bubble formation, the storage capability, or the adhesion, and also to adapt the use properties to the intended purpose. Examples of auxiliary substances are leveling agents, wetting agents, catalysts, ageing inhibitors, dyes, drying agents, resins, and/or waxes.

For example, the composition according to the invention may additionally contain stabilizers. Within the meaning of the present invention, stabilizers are understood to mean antioxidants, UV stabilizers, or hydrolysis stabilizers. Examples of such are the commercially available sterically hindered phenols and/or thioethers and/or substituted benzotriazoles and/or amines of the hindered amine light stabilizer (HALS) type.

Catalysts may also be used. The customary organometallic compounds known in polyurethane chemistry are used as catalysts, for example compounds of iron, titanium, zirconium, aluminum, lead, bismuth, or in particular tin. It is preferably possible for these catalysts to contain polyhydroxy compounds, as a mixture or as a complex in a molar ratio of 0.25:1 to 2:1, selected from cyclic α-hydroxy ketones and/or triphenols having three neighboring OH groups. In particular, 5-, 6-, or 7-ring compounds may be used as α-hydroxy ketones, and 1-alkyl-substituted 2,3,4- or 3,4,5-OH derivatives may be used as triphenols. These involve substances which act as complexing agents with the metal atoms mentioned above. These complexing agents should have a number average molecular weight of less than 500 g/mol. The complexing agents may also be bound to a substrate. In particular, substances which optionally have an additional OH— are suitable as complexing agents. During the crosslinking reaction of these complexing agents, reaction may thus also take place with the reactive composition, and integral incorporation into the matrix may occur.

Another group of catalysts are those based on tertiary amines. For example, linear or cyclic aliphatic amines such as methylcyclohexylamine, dimethylbenzylamine, tributylamine, monoethanolamine, triethanolamine, diethylenetriamine, triethylenetetramine, triethylenediamine, guanidine, morpholine, N-methylmorpholine, diazabicyclooctane (DABCO), 1,8-diazabicyclo[5.4.0]undec-7-ene (DBU), or 1,5-diazabicyclo[4.3.0]non-5-ene (DBN) are suitable. The catalyst may be used in a quantity of 0.01 to approximately 5% by weight, based on the total weight of the composition.

The selection of the suitable catalyst is determined by its reactivity as well as stability. On the one hand, a high level of storage stability of the catalyst which is usually contained in the polyol component is sought. On the other hand, the catalyst should also allow a rapid crosslinking reaction. It is generally possible to establish a simple relation between the catalyst content and the reactivity, according to which the crosslinking reaction proceeds more quickly the higher the catalyst content. It has been shown that the above-mentioned tertiary amines represent particularly suitable catalysts, since they have high reactivity as well as a high level of storage stability in the polyol component.

It is also possible for small quantities of plasticizers, color pastes, or molecular sieves to be contained. Liquid compounds which absorb moisture during storage may also be used as drying agents. However, the quantity of such constituents should be less than 10% by weight, based on the total weight of the 2K PU composition. Preferably no pigments, molecular sieves, fillers, and/or plasticizers are contained. The composition according to the invention should preferably contain no organic solvents. Liquid substances having a boiling point below 200° C. at standard pressure are to be understood as solvents here. In this regard, essentially nonvolatile compounds that are used for dispersing or dissolving additives are not considered to be solvents.

In addition, resins may optionally be contained. These may be natural resins or synthetic resins. One particular embodiment uses resins which contain hydroxyl groups, in particular resins containing multiple hydroxyl groups. These hydroxyl groups are able to react with the isocyanates. In one preferred embodiment, the quantity may be up to 15% by weight, based on the total weight of the 2K PU composition. If resins which contain hydroxyl groups are used, they are used only as a constituent of the polyol component and not as a constituent of the polyisocyanate component, since otherwise the viscosity of the polyisocyanate component may increase during storage due to reaction of the at least one polyisocyanate with the hydroxyl groups of the resin.

The additives are added to the components in such a way that sufficient storage stability is provided. In one preferred embodiment, no additives which promote formation of gas bubbles such as $CO_2$ in the 2K PU composition, for example mono- or polyfunctional carboxylic acids, are added. However, small quantities of carboxylic acids, which may optionally be introduced via the emulsifier, do not result in impairment of the properties of the 2K PU composition. In particular, preferably no water is added as an additive. Traces of water may be present in the polyol component, but it is preferably free of water. The 2K PU composition preferably contains less than 0.5% by weight, particularly preferably less than 0.2% by weight, of water. The 2K PU composition is preferably essentially water-free.

In order for the 2K PU polyurethane composition to be able to flow well around the fibers and thus reduce air inclusions, the 2K PU composition preferably has low viscosity. The viscosity of the mixed 2K PU composition is determined using a plate-plate viscometer (plate diameter=25.0 mm; gap width=0.800 mm, type of test: dynamic time sweep; frequency=1000.0 rad/s; deformation=10.0%, time per measurement=1 s). A 2K PU composition according to the invention preferably has a viscosity of 20 to 3000 mPas, measured at a temperature between 20 and 60° C., within 2 minutes after mixing. A viscosity of 100 to 1000 mPas measured at 20 to 40° C. is particularly preferred. The 2K PU composition according to the invention may be applied at these temperatures. The viscosity gradually increases due to the crosslinking reaction which occurs.

The 2K PU composition according to the invention has a sufficient pot life, which is preferably at least 10 minutes. The pot life is understood to mean the time after which the viscosity of a mixture at 25° C. has increased to more than 300% of the starting value, but at least to above 3000 mPas. The pot life may be influenced by the selection of the isocyanates and of the catalysts.

The 2K PU composition preferably shows a phase separation after mixing, but at the latest after curing. This is to be determined by the turbidity of the cured composition. The following test is carried out for assessing the turbidity.

The components of the polyol component are combined at 25° C. and agitated with a SpeedMixer (model DAC 600.1 VAC-P, 250-mL SpeedMixer container) at 2100 rpm for 2 min. The mixture is subsequently degassed under vacuum with agitation at 800 rpm for 5 min, while reducing the pressure to approximately 50 mbar by means of a diaphragm pump. The polyisocyanate component is added, and the 2K PU composition is agitated under vacuum, initially at 800 rpm for 1 min, then at 1250 rpm for 30 s, and finally at 150 rpm for 20 s. The 2K PU composition is then poured onto a plate heated to 90° C. into a 4 cm×4 cm shape (4 mm thick) and cured for 10 min. After curing, a preferred PU composition is opaque to the naked eye, i.e., forms a crosslinked multiphase system.

High mechanical stability of the cured composition is obtained due to the selection according to the invention of the polyol and the isocyanate components as well as the emulsifier. According to the invention, the crosslinked polyurethane compositions are thermosetting plastics (in accordance with DIN 7708-1:1980-12). High mechanical stability is thus ensured. In one preferred embodiment, the crosslinked composition has a glass transition temperature ($T_G$) of above 60° C., preferably above 100° C., in particular between 100° C. and 130° C. High mechanical stability of the cured composite system is made possible by the high glass transition temperature. The structural stability of the matrix material may be measured via the modulus of elasticity, for example. In one preferred embodiment, the crosslinked two-component polyurethane composition has a modulus of elasticity of greater than 1000 MPa, preferably greater than 2000 MPa, in particular greater than 3000 MPa, at temperatures between −10° C. and +70° C. The K1C value (stress intensity factor) is preferably greater than 0.5 MPa $m^{1/2}$, in particular greater than 1.0 MPa $m^{1/2}$.

The 2K PU compositions according to the invention are suitable as a matrix resin for fiber composites. These may be used in various application processes, for example in the resin transfer molding (RTM) process or in the infusion process.

Known high-strength fiber materials are suitable as fiber components of the fiber composites. These may be made, for example, of glass fibers; synthetic fibers such as polyester fibers, polyethylene fibers, polypropylene fibers, polyamide fibers, polyimide fibers, or aramid fibers; carbon fibers; boron fibers; oxidic or nonoxidic ceramic fibers such as aluminum oxide/silicon dioxide fibers, silicon carbide fibers; metal fibers such as steel or aluminum fibers; or natural fibers such as flax, hemp, or jute. These fibers may be introduced in the form of mats, woven fabrics, knitted fabrics, multi-ply woven fabrics, nonwoven fabrics, or rovings. Two or more of these fiber materials may also be used as a mixture. Short-cut fibers may be selected, but preferably synthetic long fibers are used, in particular woven fabrics and multi-ply woven fabrics. Such high-strength fibers, multi-ply woven fabrics, woven fabrics, and rovings are known to those skilled in the art.

In particular, to achieve particularly good mechanical properties, the fiber composite should contain fibers in a volume fraction of greater than 40% by volume, preferably greater than 50% by volume, particularly preferably between 50 and 70% by volume, based on the overall fiber composite. In the case of carbon fibers, the volume fraction is determined in accordance with DIN EN 2564:1998-08, and in the case of glass fibers, in accordance with DIN EN ISO 1172:1998-12.

Such a fiber composite is particularly suited as an automobile part. Such fiber composites have multiple advantages over steel: they are lighter, are characterized by improved crash resistance, and are more durable.

A further subject matter of the invention relates to a method for producing fiber composites. A mold is initially filled with fiber materials, a two-component polyurethane composition according to the invention is subsequently introduced into this mold under pressure and/or with application of a vacuum, i.e., negative pressure, and the fiber composite is cured at a temperature of up to 140° C., in particular 80 to 120° C. The curing time is less than 2 h, preferably less than 1 h, in particular less than 10 min, in particular less than 1 min. The fiber composite may be subsequently removed from the mold. Post-curing (for example, 1 h at 150° C.) may take place to achieve the final properties.

In one embodiment of the method, the fibers are placed in the molds in a predefined orientation. The quantity of fiber materials may be very high, with fiber fractions of over 40% by volume, based on the fiber composite, particularly preferably being used. Even further insert parts may optionally be introduced. The premixed composition according to the invention is subsequently introduced.

In the method according to the invention, the 2K PU composition is used immediately after mixing. Since the mixed composition reacts, it is advantageous to mix only the quantity of the components which can be processed immediately afterwards. It is likewise possible to carry out mixing and filling of the molds continuously. Since the 2K PU composition is preferably present in the form of a fine dispersion, the compositions may be easily processed using customary devices such as pumps, nozzles, or tubes. Without providing a theory, it may be assumed that the incompatibility brings about a reduction in the reaction speed.

The method according to the invention includes two embodiments. The onflow may be carried out within a short period of time by injection under pressure (resin transfer molding (RTM) process), optionally also with assistance by vacuum or negative pressure. Compositions are preferred here which have a fairly short pot life, but which subsequently show a rapid reaction. In another embodiment, the mold is filled by applying a vacuum (infusion process). A long open time is advantageous in this embodiment. The composition which is suitable according to the invention preferably has low viscosity. The viscosity increases only slightly under the process conditions of filling. The flow velocity is selected in such a way that air or gasses may escape between the fiber materials.

In the embodiment for the infusion process, a long pot life is particularly important. For this reason, in this embodiment compositions are preferably used which contain no catalysts. The flowing onto the fiber materials, displacement of air bubbles, and filling of the mold may be carried out over a fairly long period of time. Due to the slow course or progression of the reaction, the fiber materials may be completely embedded in the matrix material.

In the embodiment as the RTM process, the filling of the mold must take place within a short period of time. The reaction mixture is introduced into the mold under pressure. Rapid embedding of the fibers may be ensured due to the low starting viscosity. In this embodiment, the compositions preferably also contain catalysts. The catalysts after a short time result in an acceleration of the reaction, so that rapid full curing takes place. This may also be assisted by an increased temperature. A brief dwell time in the mold is then possible.

The composition begins to cure after the mold is filled. This may take place without additional heat input. The heat of reaction generated by the crosslinking reaction does not result in localized overheating of the substrates. To accelerate the crosslinking reaction, it is possible to heat the filled mold to temperatures of up to 140° C., particularly preferably 80 to 120° C., thus achieving more rapid crosslinking of the matrix material. The molded part may thus be removed from the mold earlier, so that the mold is then available for further work steps. The heating temperature is preferably below the glass transition temperature of the crosslinked 2K PU composition, and is particularly preferably 10° C. or greater.

The following examples explain the invention.

EXAMPLES

Raw Materials

1. Polyol: polyether triol, hydroxyl number=550 mg KOH/g, viscosity at 25° C.=1800 mPas (Brookfield 25° C., spindle 4, 20 rpm), OH equivalent weight=102 g, number average molecular weight=300 g/mol
2. Polyisocyanate: isomeric mixture of MDI and higher-functional homologs, NCO content 32% by weight, viscosity at 25° C.=43 (Brookfield 25° C., spindle 3, 50 rpm)
3. Catalyst: solution of a bicyclic tertiary amine (DABCO) in polyol (30% by weight DABCO, based on the solution)
4. Emulsifier/release agent:
   Emulsifier 1: tetrafunctional polyol esterified with a mixture of a difunctional carboxylic acid (C6) and an unsaturated fatty acid (average C chain length 18)
   Emulsifier 2: dipentaerythrite completely esterified with oleic acid
   Emulsifier 3: diester of a dimer fatty acid with branched alcohols (average alcohol chain length C8)
   Dimer fatty acid
   Polyoxyethylene tridecyl ether phosphate Component A Polyol, emulsifier/release agent, and catalyst were combined at 25° C. and agitated with a SpeedMixer (model DAC 600.1 VAC-P, 250-mL SpeedMixer container) at 2100 rpm for 2 min. The mixture was subsequently degassed under vacuum with agitation at 800 rpm for 5 min, while reducing the pressure to approximately 50 mbar by means of a diaphragm pump.

Component B

The polyisocyanate was used as component B.

2K PU Composition

Component A and component B were mixed and agitated under vacuum, initially at 800 rpm for 1 min, then at 1250 rpm for 30 s, and finally at 150 rpm for 20 s. Immediately after production, test specimens (4 mm thick) from the samples were poured and cured at 95° C. (45 min) and 130° C. (60 min).

The results for different emulsifiers are presented in Table 1. The turbidity of the polyol mixture and of the cured 2K PU composition was determined as described above.

The K1C value was determined in accordance with ISO 13586:2000, using a Zwick Z 020 test apparatus and an effective force of 1 kN.

For determining the separation effect, a 2K PU composition was produced as above, poured onto a plate heated to 90° C. into a 4 cm×4 cm shape (4 mm thick), and cured for 10 min. The mold was subsequently removed, the plate together with the molded body adhered thereto was positioned vertically, and the maximum force necessary for shearing was determined using a Zwick Z 010 test apparatus and converted into a stress (force/surface area, with a surface area of 16 cm$^2$).

TABLE 1

| | | Example | | | | Comparison | | |
|---|---|---|---|---|---|---|---|---|
| | | 1 | 2a | 2b | 3 | 4 | 5 | 6 |
| Polyol [g] | | 42.5 | 42.51 | 42.31 | 42.51 | 42.5 | 42.5 | 42.5 |
| Polyisocyanate [g] | | 56.1 | 56.13 | 55.9 | 56.13 | 56.1 | 56.1 | 56.1 |
| Emulsifier/release agent [g] | Emulsifier 1 | 0.86 | | | | | | |
| | Emulsifier 2 | | 0.86 | 1.29 | | | | |
| | Emulsifier 3 | | | | 0.86 | | | |
| | Dimer fatty acid | | | | | | 0.86 | |
| | Polyoxyethylene tridecyl ether phosphate | | | | | | | 0.86 |
| Catalyst [g] | | 0.5 | 0.5 | 0.5 | 0.5 | 0.5 | 0.5 | 0.5 |
| Properties of the polyol mixture with emulsifier/release agent | Turbidity (not homogeneously miscible, i.e., transmittance < 90%) | Yes | Yes | Yes | Yes | No | No | No |
| Properties of the cured resin without fibers | Turbidity | Yes | Yes | Yes | Yes | No | No | No |
| | Bubbles | No | No | No | No | Yes | Yes | Yes |
| | Separation effect [N/cm$^2$] | 7.4 | 4.3 | 4.1 | 7.2 | 48 | 14.8 | 14.4 |
| | K1C [MPa m$^{1/2}$] | 1.4 | 1.4 | 1.6 | 1.4 | 1.2 | | |

The invention claimed is:

1. A method for producing a composite of fibers in a matrix of a crosslinked two-component polyurethane composition, comprising
   (i) providing a mold;
   (ii) providing fibers;
   (iii) providing a mixed two-component polyurethane composition, the two-component polyurethane composition comprising
      10 to 80% by weight of at least one polyol having a number average molecular weight of 104 to 3000 g/mol, wherein the polyol is a polyether polyol,
      5 to 70% by weight of at least one polyisocyanate selected from the group consisting of MDI, higher-functional homologs, and combinations thereof, and
      0.2 to 1.29% by weight of at least one emulsifier selected from a group consisting of: a tetrafunctional polyol esterified with a mixture of a difunctional carboxylic acid and an unsaturated fatty acid having an average C atom chain length of 18; dipentaerythritol completely esterified with oleic acid; diester of a dimer fatty acid with branched alcohols having an average C atom chain length of 8; and combinations thereof,
   wherein the composition is free of low molecular weight polyols having an OH functionality of 2 and a molecular weight of 100 or less and contains the at least one polyol and the at least one polyisocyanate in an NCO:OH ratio of 2:1 to 1:2, and the transmittance of a mixture of the at least one emulsifier and the at least one polyol at 860 nm is less than 90%; and
   wherein the % by weight relate to the total weight of the two-component polyurethane composition,
   (iv) disposing the fibers in the mold;
   (v) closing the mold around the fibers;
   (vi) introducing the mixed two-component polyurethane composition into the closed mold under pressure and/or vacuum;
   (vii) curing the fibers and mixed two-component polyurethane composition in the mold to form the composite; and
   (viii) removing the composite from the mold.

2. The method according to claim 1, wherein the at least one polyol has an average OH functionality of 3 to 5.

3. The method according to claim 1, wherein the at least one polyisocyanate has an NCO content of 30 to 50% by weight, based on the weight of the at least one polyisocyanate.

4. The method according to claim 1, wherein less than 3 mol-% of the NCO groups are reacted to form carbodiimide and/or uretonimine groups.

5. A composite comprising fibers in a matrix of a crosslinked two-component polyurethane composition according to claim 1.

6. The composite according to claim 5, wherein the crosslinked two-component polyurethane composition has a glass transition temperature $T_G$ of above 60° C.

7. The composite according to claim 5, wherein the crosslinked two-component polyurethane composition has a modulus of elasticity of greater than 1000 MPa at temperatures between −10° C. and +70° C.

8. The composite according to claim 5, wherein the fibers are contained in a volume fraction of greater than 40% by volume, based on the overall composite.

9. An automotive component comprising the composite according to claim 5.

10. The method according to claim 1, wherein the at least one emulsifier is not homogeneously miscible with the at least one polyol.

11. The method of claim 1 being resin transfer molding (RTM).

12. The method of claim 1 wherein the cured composite is free of bubbles.

13. A method for producing a composite of fibers in a matrix of a crosslinked two-component polyurethane composition, comprising:
   (i) providing a mold;
   (ii) providing fibers;
   (iii) providing a mixed two-component polyurethane composition, the two-component polyurethane composition consisting of
      10 to 80% by weight of at least one polyol having a number average molecular weight of 150 to 3000 g/mol, wherein the polyol is a polyether triol or polyether diol or mixture thereof,
      40 to 70% by weight of at least one polyisocyanate, wherein the polyisocyanate is selected from the group consisting of MDI, higher-functional homologs, and combinations thereof, and
      0.5 to 6% by weight of at least one emulsifier selected from the group consisting of: a tetrafunctional polyol esterified with a mixture of a difunctional carboxylic acid and an unsaturated fatty acid having an average C atom chain length of 18; dipentaerythritol completely esterified with oleic acid; diester of a dimer fatty acid with branched alcohols having an average C atom chain length of 8; and combinations thereof, and
      at least one additive selected from the group consisting of leveling agent, wetting gent, catalyst, age inhibitor, drying agent, resin, wax, stabilizer, plasticizer, pigment, drying agent and combinations thereof,
   wherein the composition is free of low molecular weight polyols having an OH functionality of 2 and a molecular weight of 100 or less and contains the at least one polyol and the at least one polyisocyanate in an NCO:OH ratio of 2:1 to 1:2, and the transmittance of a mixture of the at least one emulsifier and the at least one polyol at 860 nm is less than 90%;
   (iv) disposing the fibers in the mold;
   (v) closing the mold around the fibers;
   (vi) introducing the mixed two-component polyurethane composition into the closed mold under pressure and/or vacuum;
   (vii) curing the fibers and mixed two-component polyurethane composition in the mold to form the composite; and
   (viii) removing the composite from the mold.

14. The method according to claim 13, wherein the at least one emulsifier consists of diester of a dimer fatty acid with branched alcohols having an average C atom chain length of 8.

15. The method according to claim 13, wherein the at least one emulsifier consists of tetrafunctional polyol esterified with a mixture of a difunctional carboxylic acid and an unsaturated fatty acid having an average C atom chain length of 18.

16. The method according to claim 13, wherein the at least one emulsifier consists of dipentaerythritol completely esterified with oleic acid.

17. The method according to claim 13, wherein polyether polyol is a polyether diol.

18. The method according to claim 13, wherein polyether polyol is a polyether triol.

19. The method according to claim 1, wherein the mixed two-component polyurethane composition comprises 0.86 to 1.29% by weight of the at least one emulsifier.

* * * * *